United States Patent Office 3,359,277
Patented Dec. 19, 1967

3,359,277
CHLOROPHYLL DERIVATIVE
William Mitchell, London, and Stanley Arthur Wood, Woodford Green, Essex, England, assignors to Stafford Allen & Sons Limited, London, England, a company of Great Britain, Northern Ireland and the Isle of Man
No Drawing. Filed Nov. 9, 1964, Ser. No. 409,979
Claims priority, application Great Britain, Nov. 13, 1963, 44,847/63
12 Claims. (Cl. 260—314)

This invention relates to water-soluble chlorophyll derivatives, the term "chlorophyll" being used herein to include compounds in which the chelated magnesium of chlorophyll properly so called has been replaced by hydrogen or by another metal, for example, copper.

Water-soluble chlorophyll derivatives, often called water-soluble chlorophylls, are normally made by the hydrolysis of chlorophyll extracted from green vegetable material, such as lucerne or grass. They consist of the salts (usually sodium or potassium) of the mixed chlorins and rhodins derived from chlorophylls $a$ and $b$. It will be understood that the chlorins and rhodins may have been wholly or partially converted into related compounds, for example by oxidation, during the normal commercial processing of the chlorophyll, and the terms "chlorin" and "rhodin" as used herein include such related compounds. The water-soluble derivatives may also contain as impurities the corresponding salts of fatty acids and other acidic materials as well as carotenoids, phytol, sterols and other substances all derived from the vegetable material. The purer preparations are more or less free from these associated substances.

Such products suffer from several disadvantages. Insoluble salts are precipitated if cations, other than those of the alkali metals, are added to their aqueous solutions. Moreover, the chlorins and rhodins are such weak acids, and are so sparingly soluble in the free state in water, that they are precipitated by mineral acids and even by carbon dioxide. Further, the water-soluble chlorophylls have a very poor light stability so that solutions become more or less bleached on exposure to light. Water-soluble chlorophylls could be of interest as food colours, particularly because they are accepted as being non-toxic, but the properties mentioned render those described above unsuitable. In this connection it is to be remembered that foodstuffs are almost invariably acidic.

We have found that water-soluble chlorophylls of the kind described above will readily react with sultones to produce esters which, either as salts or in the form of free sulphonic acids, are readily water-soluble and are stable in acid solution. We tried reacting chlorophyll with a great many substances to produce a water-soluble product but were unsuccessful owing to degradation of the complicated molecular structure of chlorophyll. Although it is known that sultones, in particular 1,3-propyl sultone, can be reacted with many organic substances including alkali metal salts of carboxylic acids, these substances have all been of relatively simple structure, and it is surprising that the chlorophyll hydrolysis products, that have large molecular structures, are rendered water-soluble, even in acid solution, as a result of reacting with sultones.

Accordingly the present invention provides as a novel water-soluble chlorophyll derivative the reaction product of a sultone and a water-soluble chlorophyll obtained by the hydrolysis of chlorophylls $a$ and $b$.

The products of the invention are in fact esters of the acidic chlorins and rhodins which are produced by the hydrolysis of chlorophylls $a$ and $b$ with the hydroxy-alkyl sulphonic acid corresponding to the sultone employed.

Sultones are the inner anhydrides (or inner esters) of 1,3- or 1,4-hydroxy-alkyl sulphonic acids. The sultones in which the alkyl radical is one in which there are not more than 6 carbon atoms are preferred for use in the invention. These include the 1,3-propyl, 1,4-butyl, iso-amyl, pentyl, n-hexyl, and iso-hexyl derivatives. In fact, the most advantageous is the 1,3-propyl sultone having the structural formula:

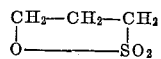

Although the sultones can be caused to react with relatively crude water-soluble chlorophylls, we prefer to employ as starting material highly purified water-soluble chlorophylls assaying at minimum 100 percent by spectrophotometric assay (J. Amer. Med. Assoc., (1951) 146, 35). As mentioned above, the invention may be applied to water-soluble chlorophylls containing chelated copper, or other suitable metal, for example another divalent heavy metal, in place of the magnesium present in true chlorophyll derivatives or may be free or substantially free from all such chelated metals.

It is known that reactions with sultones can be carried out in organic solvents or even in water, where the reaction of the sultone with water is less rapid than that with the compound to be reacted. We have found surprisingly that the latter is the case when the compound to be reacted is chlorophyll, which enables the reaction to be carried out in an aqueous solution. If desired, however, the reaction can be carried out in an organic solvent, such as toluene, 1,4-dioxan or acetone, but we have found that the presence of a small amount of water is essential. One or more of the free carboxyl groups (as an alkali metal salt) of the chlorophyll derivatives is believed to react with the sultone to give an ester in practically theoretical yield according to the reaction (where 1,3-propyl sultone is used):

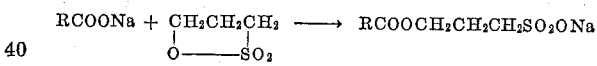

in which R represents the rest of the chlorin or similar chlorophyll derivatives.

The products are blue-black solids that are stable in air, are hygroscopic without becoming damp, and are freely soluble in water, and in the lower alkanols when these are diluted so that they contain at least 10% v./v. of water. Such solutions are neutral in reaction, and no precipitation of solids occurs over the whole pH range. Further the addition of salts, such as calcium chloride in concentrations such as are met with in food-stuffs, does not cause any precipitation of insoluble salts from acidic solutions of the esters of the chlorophyll derivatives.

The invention has the important advantage that it enables comparatively light-stable solutions of chlorophylls to be obtained. We have found that the chlorophyll derivatives of the invention in which the chelated metal is a divalent heavy metal, especially copper, when in neutral or acid aqueous solution and exposed to daylight, for long periods, fade only slightly. Their precursors in alkaline aqueous solution, on the other hand exhibit significant fading. Thus, by making it possible to produce chemically stable acidic and neutral aqueous solutions of these chlorophylls, solutions with good stability to light can now be obtained.

The products of the invention can, in addition to their general use as green colouring materials, be used for imparting a desirable green colour to canned peas and other vegetables, and for colouring various other foodstuffs.

The invention is further illustrated by the following examples of the preparation of the esters. The water-soluble chlorophylls used as reactants were, as defined above, at minimum 100%.

Example 1

Sodium copper chlorophyllin (9.6 g.) was dissolved in water (48 ml.), 1,3-propane-sultone (2.0 g.) was added, and the mixture was boiled under reflux for 15 minutes. The solution was then evaporated to dryness under atmospheric pressure to give the sodium salts of the required esters of the mixed chlorophyll derivatives as a blue-black solid; yield 11.5 g.

Example 2

Example 1 was repeated, but using sodium potassium copper chlorophyllin (9.6 g.) instead of sodium copper chlorophyllin, and heating at 50° C. for 30 min., and evaporating the final solution in vacuo; yield 11.6 g.

Example 3

Example 1 was repeated, but using sodium chlorophyllin (8.6 g.) instead of sodium copper chlorophyllin; yield 10.6 g.

Example 4

Sodium copper chlorophyllin (9.6 g.) and 1,3-propane-sultone (2.0 g.) were added to toluene (46 ml.) containing water (1 ml.), and the mixture was boiled under reflux for 1 hour. The product, being insoluble in toluene, was collected on a filter and dried. It was a blue-black solid; yield 11.4 g.

Example 5

Example 4 was repeated, but using sodium chlorophyllin (8.6 g.) instead of sodium copper chlorophyllin; yield 10.5 g.

Example 6

Example 4 was repeated, but using dioxan (100 ml.) instead of toluene, and refluxing for 2 hours. The product, insoluble in the reaction mixture, was collected by filtration, and dried; yield 11.6 g.

Example 7

Sodium chlorophyllin (8.6 g.) and 1,3-propanesultone (2.0 g.) were dissolved in 50% v./v. aqueous acetone, and the mixture was boiled under reflux for 2 hours. The product was isolated by evaporating the solution to dryness; yield 10.5 g.

Example 8

Example 7 was repeated, but using sodium potassium chlorophyllin (8.6 g.) instead of sodium chlorophyllin, and refluxing for 1½ hours; yield 10.5 g.

Although the above examples illustrate combinations of specific conditions they can, of course, be varied. Thus, the proportion of sultone to be used varies with the purity of the chlorophyll employed. The choice of solvent, concentrations, reaction temperature (preferably above a minimum of 30° C.; higher temperatures require shorter times), the duration of heating (above a minimum of 15 minutes, using water), and the amount of water present are not critical.

The products of the invention are of low toxicity. Thus the products of Examples 2 and 3 have been tested for acute toxicity to rats and have been found to be only slightly toxic or practically non-toxic according to the criteria in vol. 1 of the Handbook of Toxicology edited by W. S. Spector, 1956. The results of the tests were as follows:

| Product: | $LD_{50}$ (mg./kg.) |
|---|---|
| Example 2 | 5300 |
| Starting chlorophyll of Example 2 | 4500 |
| Example 3 | 6300 |
| Starting chlorophyll of Example 3 | 7200 |

What we claim is:

1. A method of producing a water-soluble ester that is stable in acid solution of a chlorophyllin and a sultone having from three to six carbon atoms, which comprises heating at a temperature of at least about 30° C. up to solvent reflux temperature in the presence of a solvent selected from the group consisting of water and inert volatile organic solvent selected from the group consisting of toluene, 1,4-dioxane and acetone, and comprising at least a small amount of water, a sultone having from about three to about six carbon atoms, and a water-soluble chlorophyllin in the form of the sodium or potassium salt thereof, derived from chlorophyll $a$ and chlorophyll $b$, (a) water-soluble chlorophyll free from chelated metal and (b) water-soluble chlorophyll chelated with copper or magnesium, until the corresponding sulfonic acid ester is formed.

2. A method according to claim 1 in which the sultone is 1,3-propyl sultone.

3. A method according to claim 1 wherein the solvent is water.

4. A method according to claim 1 wherein the solvent is a mixture of water and the organic solvent.

5. A method according to claim 4 wherein the organic solvent is toluene.

6. A method according to claim 4 wherein the organic solvent is acetone.

7. A method according to claim 4 wherein the organic solvent is dioxan.

8. A method according to claim 1 wherein the water-soluble chlorophyllin is the sodium or potassium salt.

9. A method according to claim 8 wherein the water-soluble chlorophyllin is a sodium copper chlorophyllin.

10. A method according to claim 8 wherein the water-soluble chlorophyllin is a potassium copper chlorophyllin.

11. A method according to claim 8 wherein the water-soluble chlorophyllin is a sodium chlorophyllin.

12. A method according to claim 8 wherein the water-soluble chlorophyllin is a potassium chlorophyllin.

References Cited

UNITED STATES PATENTS 3,151,123    9/1964    Schenck et al. _____ 260—314

WALTER A. MODANCE, *Primary Examiner.*

JOHN D. RANDOLPH, *Examiner.*

H. I. MOATZ, *Assistant Examiner.*